May 10, 1932.   B. S. BURRELL   1,857,527

MEANS FOR LUBRICATING CONNECTERS

Original Filed April 14, 1928

Inventor:
Benjamin S. Burrett
By Dynenforth, Lee, Chritton & Wiles
Attys.

Patented May 10, 1932

1,857,527

UNITED STATES PATENT OFFICE

BENJAMIN S. BURRELL, OF EAST CHICAGO, INDIANA

MEANS FOR LUBRICATING CONNECTERS

Original application filed April 14, 1928, Serial No. 270,070. Divided and this application filed February 11, 1931. Serial No. 515,089.

My invention relates, more particularly, to the lubricating of the connections between drive and driven rotary members such as, for example, and more particularly, the loose and wobbling connections commonly employed in relatively heavy machines, as for example, between drive-spindles and the rolls of rolling mills which are driven at relatively slow speed, the present application as to certain features thereof being a division of my application for Letters Patent Serial No. 270,070, filed April 14, 1928, now matured into Patent No. 1,782,337.

Such connections are subject to very rapid wear, with consequently impairment unless properly lubricated, due to the great rubbing action which occurs in use between the opposing surfaces of the connecting means.

My object is to provide a novel, simple and effective means for adequately lubricating such connecters to the end of greatly prolonging their life; to provide for such lubricating without waste of lubricant and at a relatively low cost for labor; and to provide for the substantially uniform supplying of the lubricant to the various interfitting drive and driven surfaces to be lubricated; and other objects as will be manifest from the following description.

Referring to the accompanying drawings.

Figure 1:
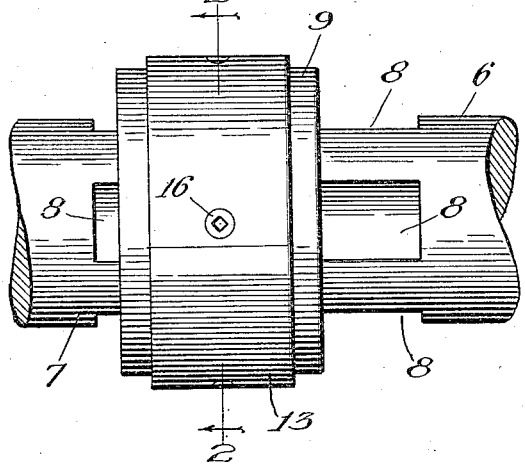
Figure 1 is a view in side elevation of the adjacent ends of a drive spindle of a rolling mill and a roll to be driven thereby, together with a coupling box connecting together the spindle and roll for drive of the latter from the spindle, the structure being provided with lubricating means constituting one of the embodiments of my invention.
Figure 2:
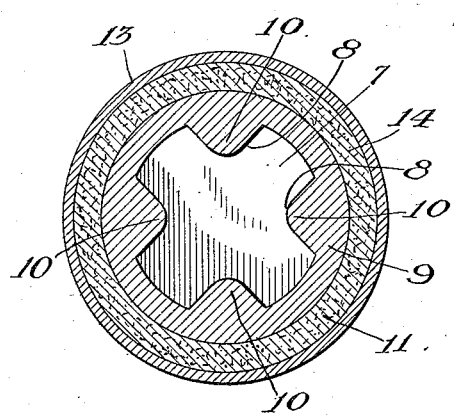
Figure 2 is a section taken at the line 2—2 on Fig. 1 and viewed in the direction of the arrow.
Figure 3:
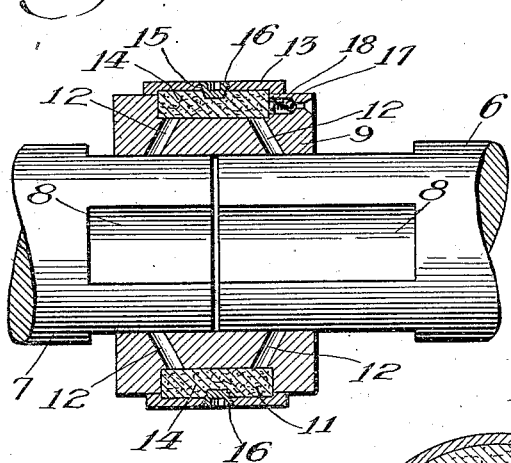
Figure 3 is a view in side elevation of the structure shown in Fig. 1, the coupling box being shown in section.
Figure 4:
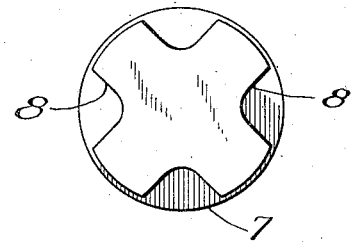
Figure 4 is an end view showing the form of the adjacent opposed ends of the spindle and roll.

Referring to the construction shown in Figs. 1, 2, 3 and 4, an end of the rotary spindle, as for example of a rolling mill, is shown at 6 and the adjacent end of a roll, as for example, of such a mill and substantially alined with the spindle 6, as shown at 7, these ends of the spindle and roll being preferably longitudinally grooved at intervals about their peripheries, as represented at 8.

The coupling of the spindle 6 and roll 7 for drive of the latter from the spindle is by means of a coupling box 9 open at its opposite ends at which it extends loosely over the opposing ends of the spindle and roll, the inner wall of the box 9 containing longitudinally-extending, inwardly projecting, ribs 10 which loosely extend into the grooves 8 in the spindle and roll, thereby providing a loose or wobbling, drive connection between these parts.

In accordance with this embodiment of my invention, the coupling box 9 is provided with a peripherally disposed continuous lubricant-receiving passage or chamber 11, the chamber 11 being provided with outlets 12, provided of any desired number and arrangement which open into the interior of the box 9 for the passage of lubricant supplied to the chamber 11, as hereinafter described, into the joints between the box and the spindle and roll to lubricate the mutually contacting surfaces of these parts.

The chamber 11 in the particular construction shown is formed by peripherally grooving the box 9 and forming the outer wall of this chamber of a band 13 secured to the body of the box 9 in any desired way.

The chamber 11 is preferably charged with grease absorbing material 14 such as, for example, wool yarn, introduced into the chamber 11 through openings 15 in the band 13 and provided with removable screw plugs 16, the lubricant, preferably in the form of grease, being charged into the chamber 11 through an inwardly opening check-valve 17 in the outer end of a lubricant inlet 18 in the member 9, the lubricant becoming disseminated throughout the mass 14 of material.

Figure 5:
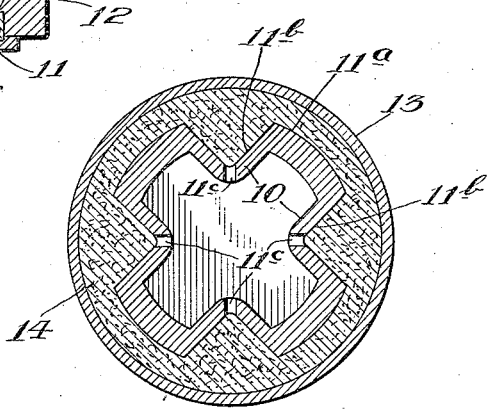
Figure 5, a view like Fig. 2 of a modification of the construction shown in Figs. 1–4, inclusive.

The construction shown in Fig. 5 is the same as that of the preceding figures except that instead of providing the chamber 11 as of substantially uniform depth throughout its periphery, this chamber represented at 11ª and extending continuously around the box 9 is provided with enlargements represented at 11ᵇ which project radially inward toward the central axis of this member and are arranged substantially coincident with the projections 10, the outlets for the chamber 11 thus provided opening to the interior of the box for supplying lubricant to the joints, through the apex portions of the projections 10, as represented at 11ᶜ.

It will be understood from the foregoing that by incorporating my invention in the driving connection between rotary members, efficient and continuing lubrication of the contacting surfaces at the connection between these parts is effected and without requiring frequent replenishment of the lubricant, thereby greatly minimizing wear and impairment of the structure.

Furthermore, the structure, particularly that provided in Figs. 1-4, is of simple construction and by providing the continuous lubricant chamber whether of the form shown in Fig. 1 to 4 or Fig. 5, or any other form if desired, the distribution of the lubricant throughout the chamber and thus substantially uniform distribution of the lubricant to all of the surfaces to be lubricated results.

While I have illustrated and described certain forms of structure in which my invention is embodied, I do not wish to be understood as intending to limit it thereto as the same may be variously modified and altered and the invention embodied in other forms of structure without departing from the spirit of my invention.

What I claim as new, and desire to secure by Letters Patent, is:

1. In combination, a rotatable drive member, a rotatable member to be driven thereby, and a rotatable coupler member encircling at its ends the ends of the others of said members and having loose driving connection with each thereof thereby providing a driving connection between said first and second-named members, said rotatable coupler member containing an endless lubricant chamber surrounding the opening in said coupler member and communicating with the interior of said coupler member for supplying lubricant to the driving and driven surfaces of said members.

2. In combination, a rotatable drive member, a rotatable member to be driven thereby, and a rotatable coupler member encircling at its ends the ends of the others of said members and having loose driving connection with each thereof thereby providing a driving connection between said first and second named members, said rotatable coupler member containing an endless lubricant chamber surrounding the opening in said coupler member and communicating with the interior of said coupler member for supplying lubricant to the driving and driven surfaces of said members, and means for forcing the lubricant from the chamber toward the surfaces to be lubricated.

3. A wobbling coupler construction comprising a rotatable drive member, a rotatable member to be driven thereby, and a rotatable coupler member encircling at its ends the ends of the others of said members and having inwardly extending projections at which said coupler member has wobbling driving connection with each of said first and second named members, said coupler member containing lubricant chambers extending into certain of said projections and opening into the interior of said coupler member for supplying lubricant to the driving and driven surfaces of said members, said chambers having outlets and also being in communication with each other.

4. A wobbling coupler construction comprising a rotatable drive member, a rotatable member to be driven thereby, and a rotatable coupler member encircling at its ends the ends of the others of said members and having inwardly extending projections at which said coupler member has wobbling driving connection with each of said first and second named members, said coupler member containing an endless lubricant chamber surrounding the opening in said coupler member and having enlargements extending into said projections and opening into the interior of said coupler member for supplying the lubricant to the driving and driven surfaces of said members.

BENJAMIN S. BURRELL.